United States Patent
Tu

(10) Patent No.: US 8,011,934 B2
(45) Date of Patent: Sep. 6, 2011

(54) CAMERA APPARATUS, PORTABLE ELECTRONIC DEVICE USING THE CAMERA APPARATUS AND METHOD OF ASSEMBLING THE PORTABLE ELECTRONIC DEVICE

(75) Inventor: Feng Tu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/819,298

(22) Filed: Jun. 21, 2010

(65) Prior Publication Data
US 2011/0177712 A1 Jul. 21, 2011

(30) Foreign Application Priority Data
Jan. 15, 2010 (CN) .......................... 2010 10 300362

(51) Int. Cl.
*H01R 12/00* (2006.01)

(52) U.S. Cl. ............................................. 439/67; 439/71
(58) Field of Classification Search ................... 439/67, 439/71, 607.1
See application file for complete search history.

(56) References Cited

U.S. PATENT DOCUMENTS

| 6,939,172 B2 * | 9/2005 | Lu ............................... 439/607.2 |
| 7,422,482 B2 * | 9/2008 | Wang ....................... 439/607.01 |
| 7,435,139 B2 * | 10/2008 | Yang ........................ 439/607.01 |
| 7,578,677 B2 * | 8/2009 | Wu .................................. 439/67 |
| 7,722,398 B2 * | 5/2010 | Ma ........................... 439/607.04 |
| 2008/0050941 A1 * | 2/2008 | Zhang ............................. 439/67 |

* cited by examiner

*Primary Examiner* — Hien Vu
(74) *Attorney, Agent, or Firm* — Altis Law Group, Inc.

(57) ABSTRACT

A camera apparatus attached to a portable electronic device includes a camera module, a holder, and a PCB. The holder includes a socket and a resisting member secured in the socket. The PCB includes a contact portion. The contact portion and the camera module are received in the socket. The resisting member pushes the contact portion toward the camera module.

9 Claims, 5 Drawing Sheets

CAMERA APPARATUS, PORTABLE ELECTRONIC DEVICE USING THE CAMERA APPARATUS AND METHOD OF ASSEMBLING THE PORTABLE ELECTRONIC DEVICE

BACKGROUND

1. Technical Field

The disclosure generally relates to camera apparatuses, particularly to a camera apparatus for a portable electronic device and a method of assembling the camera apparatus to the portable electronic device.

2. Description of Related Art

Camera modules are generally included in most portable electronic devices, such as mobile phones, or personal digital assistants, having an imaging function (e.g. still and/or video photography). In a conventional method of assembling a camera module to a portable electronic device, the camera module is attached to a housing and is electrically connected to a printed circuited board (PCB). However, because of weak connections, the camera module may easily disconnect from the PCB, which will effect the imaging function of the portable electronic device.

Therefore, there is room for improvement within the art.

BRIEF DESCRIPTION OF THE DRAWINGS

Many aspects of the camera apparatus and the portable electronic device using the camera apparatus and method of assembling the portable electronic device can be better understood with reference to the following drawings. The components in the drawings are not necessarily drawn to scale, the emphasis instead being placed upon clearly illustrating the principles of the camera apparatus and the portable electronic device using the camera apparatus and method of assembling the portable electronic device.

DETAILED DESCRIPTION

Figure 1:
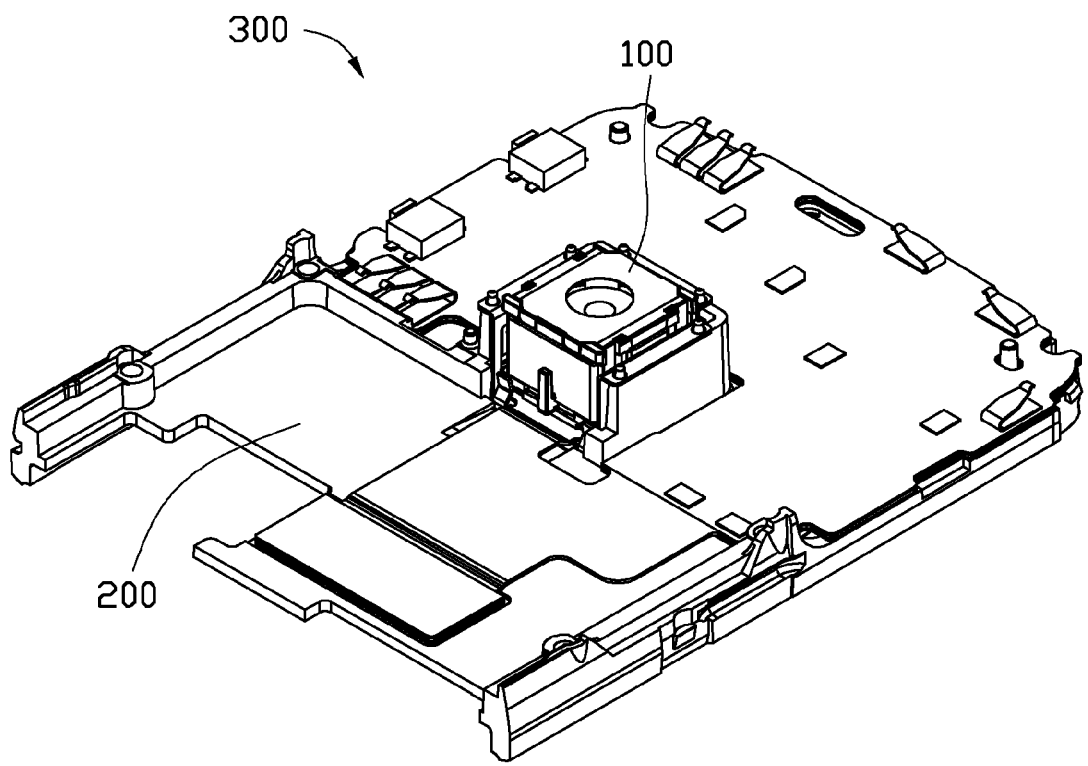
FIG. 1 shows a schematic view of a portion of a portable electronic device with a camera apparatus, according to an exemplary embodiment.

FIG. 1 shows a portable electronic device 300 (partially shown) including a camera apparatus 100 and a housing 200. The camera apparatus 100 is attached to the housing 200.

Figure 2:
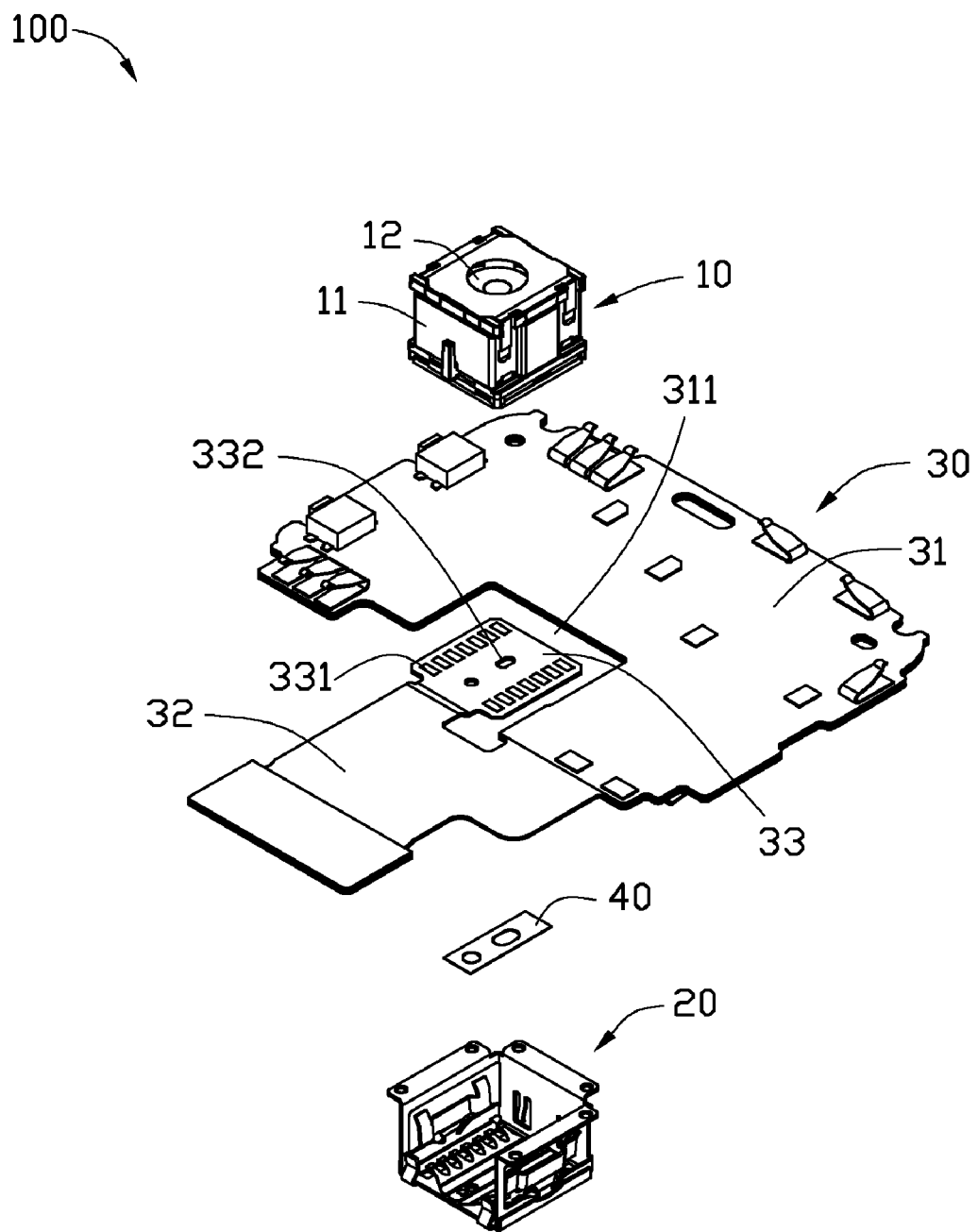
FIG. 2 shows a partially exploded and schematic view of the camera apparatus shown in FIG. 1.
Figure 3:
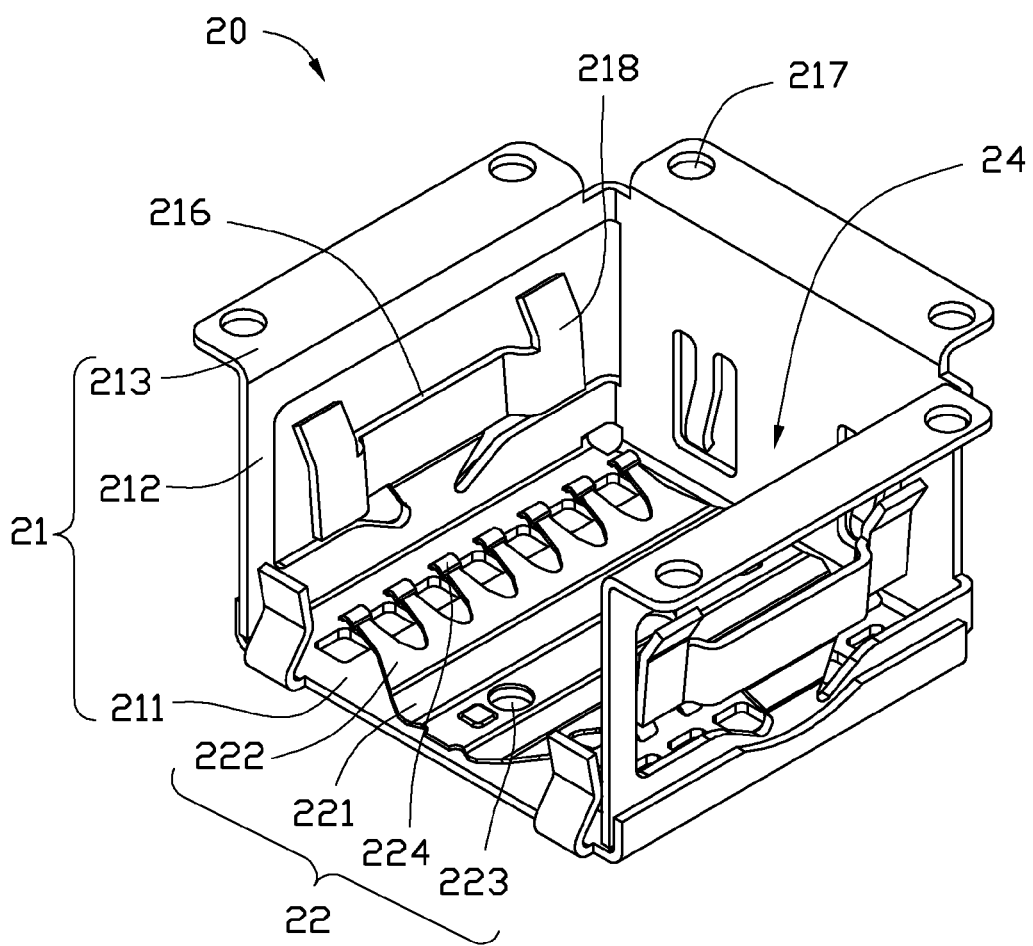
FIG. 3 shows an enlarged view of a holder of the camera apparatus shown in FIG. 1.
Figure 4:
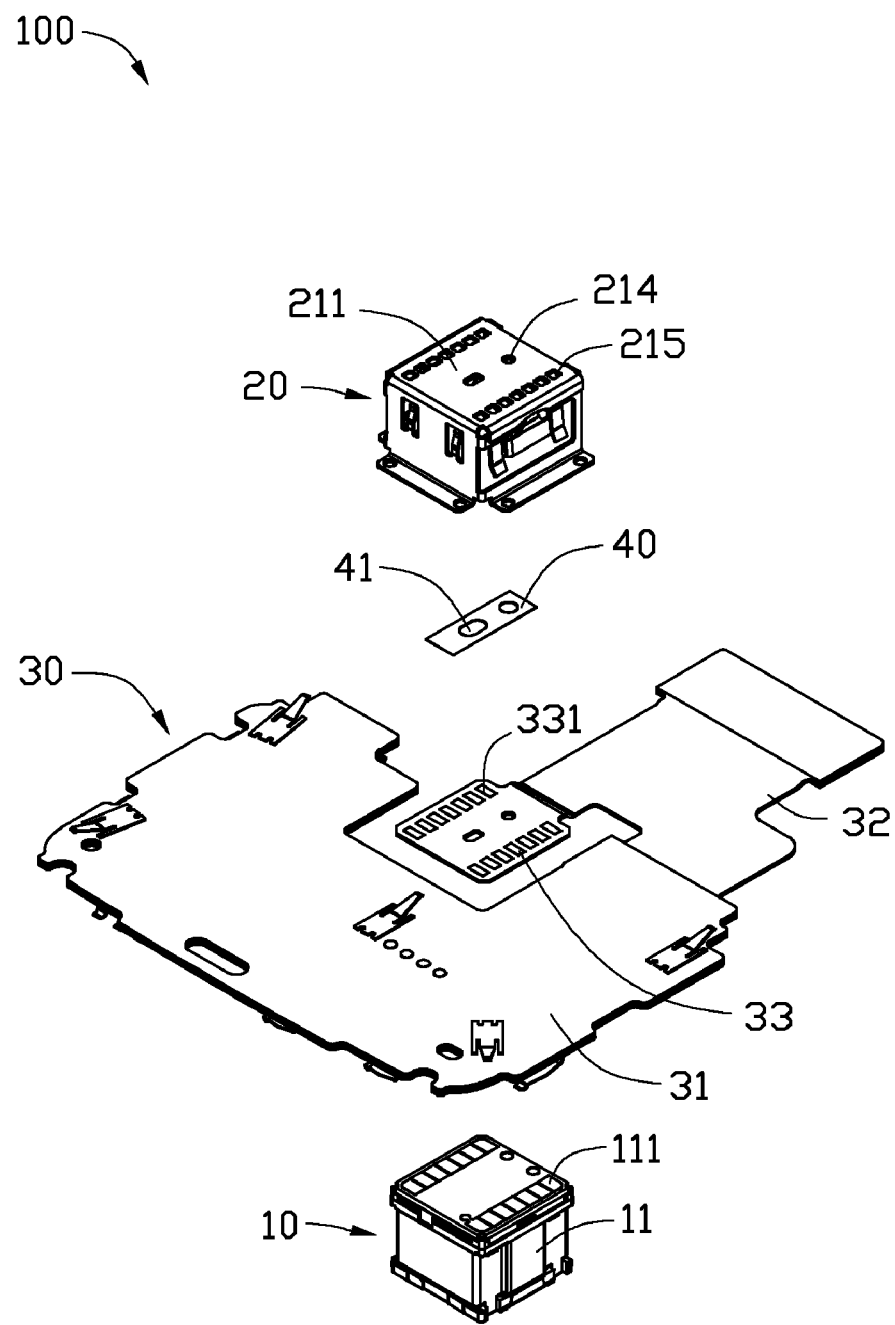
FIG. 4 is similar to FIG. 2, but shown from another aspect.

Referring to FIGS. 2, 3 and 4, the camera apparatus 100 includes a camera module 10, a holder 20, a PCB 30, and a fixing member 40.

The camera module 10 includes a base portion 11 and a lens module 12. The base portion 11 defines an aperture (not labeled) in a side thereof. The lens module 12 is built in the base portion 11 and is exposed by the aperture. A plurality of first contacts 111 (best shown in FIG. 4) are arranged at another side of the base portion 11 opposite to the lens module 12, and electrically connected to the lens module 12 to the PCB 30.

The holder 20 includes a socket 21 and a resisting member 22. The socket 21 has an open end. The socket 21 includes a bottom wall 211, and three side walls 212 extending from the bottom wall 211, and thereby defines a socket space 24 to receive the camera module 10. The bottom wall 211 defines two positioning holes 214 (best shown in FIG. 4) near a middle portion thereof and a plurality of receiving holes 215 (best shown in FIG. 4) at two opposite sides thereof corresponding to the first contacts 111. Each of the two opposite side walls 212 includes a latching member 216 extending up from the bottom wall 211. The latching member 216 may be substantially U-shaped and has two latching ends 218 to clamp to the camera module 10 received therein. A plurality of fixing ends 213 perpendicularly extend from the edges of the side walls 212. One or more fixing holes 217 are defined in each of the fixing ends 213 to fix the socket 21 to the housing 200.

The resisting member 22 includes a main portion 221 and two opposite resisting portions 222 extending from two sides of the main portion 221. The main portion 221 defines positioning holes 223 in an approximate middle portion thereof corresponding to the positioning holes 214 of the bottom wall 211. Each resisting portion 222 includes a plurality of spaced and elastic resisting plates 224 corresponding to the receiving holes 215. Each resisting plate 224 extends from the edge of the resisting portion 222 and deforms opposite to the bottom wall 211. The main portion 221 of the resisting member 22 is secured on the bottom wall 211. The positioning holes 223 and each resisting plate 224 are respectively aligned with the positioning holes 214 and the corresponding receiving hole 215.

The PCB 30 includes a first portion 31, a second portion 32 and a contact portion 33. The first portion 31 is generally rectangular and defines a cutout 311 at one side thereof. The second portion 32 is disposed at one side of the first portion 31 facing towards the cutout 311 and connects the first portion 31 and the contact portion 33. The contact portion 33 includes a plurality of second contacts 331 arranged at opposite sides thereof corresponding to the first contacts 111 of the camera module 10 and defines positioning holes 332 in an approximate middle portion thereof corresponding to the positioning holes 214 of the holder 20.

The fixing member 40 is an adhesive sheet which has an adhesive such as paste or glue on both sides thereof. The fixing member 40 is sandwiched between the contact portion 33 and the resisting member 22 to fix the third portion 33 and the resisting member 22 together.

The housing 200 is substantially a plate. A mounting hole 201 is defined in the housing 200. A peripheral wall 202 extends up from the housing 200 surrounding the mounting hole 201 therein. A plurality of fixing posts 203 protrude from top surfaces of the peripheral wall 202.

Figure 5:
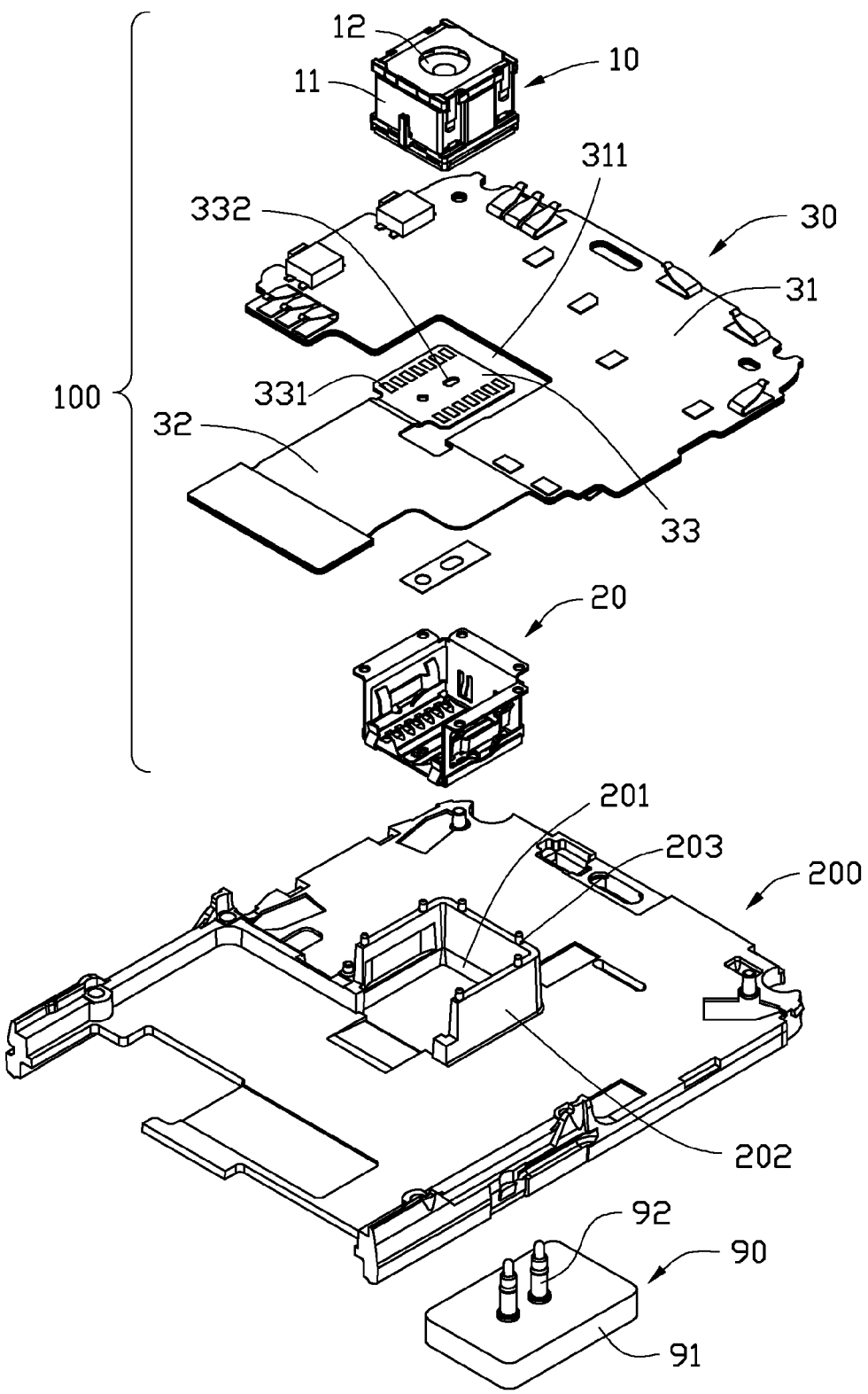
FIG. 5 shows an exploded view of the portable electronic device of FIG. 1 and a positioning structure used during assembly.

Referring to FIG. 5, a positioning structure 90 is used during assembling the portable electronic device 100. The positioning structure 90 includes a base board 91 and two elastic positioning posts 92 protruding from the base board 91. When in assembly, firstly, the holder 20 is attached to the housing 200. The fixing posts 203 are extended through the fixing holes 217 of the holder 20. The positioning structure 90 is disposed at one side opposite to the holder 20 of the housing 200 until used in the next step. The positioning posts 92 then are extended through the positioning holes 214 and 223. After that, the PCB 30 is assembled to the holder 20 with the contact portion 33 received in the socket space 24 and adhered to the main portion 221 of the resisting member 22 by the fixing member 40. Finally, the camera module 10 is received in the socket space 24 and clamped in place by the latching members 216. The positioning structure 90 can be removed from the portable electronic device 300 after assembly.

The resisting plates 224 of the resisting member 22 below the PCB 30 and the camera module 10 push the contact portion 33 of the PCB 30 toward the camera module 10 and make the contact portion 33 abut against the camera module 10, which obtains a stable and dependable electrical connection therebetween thus avoiding disconnection due to movement. In addition, the holder 20, the PCB 30 and the fixing member 40 are positioned on the housing 200 by the positioning structure 90 to provide an accurate positioning.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A camera apparatus attached to a portable electronic device, comprising:
   a camera module;
   a holder including a socket having fixing ends extended from edges of the holder, each of the fixing ends having holes and a resisting member secured in the socket; and
   a PCB including a contact portion; wherein when the contact portion and the camera module are received in the socket, the resisting member pushes the contact portion toward the camera module;
      wherein the resisting member includes a main portion and opposite resisting portions extending from two sides of the main portion, each resisting portion includes a plurality of spaced resisting plates, the main portion is secured in socket and the resisting plates pushes the contact portion; and
      a fixing member, wherein the fixing member is an adhesive sheet sandwiched between the contact portion and the main portion of the resisting member.

2. The camera apparatus as claimed in claim 1, wherein the contact portion of the PCB and the socket define at least one positioning hole.

3. The camera apparatus as claimed in claim 1, wherein the socket includes a bottom wall, and side walls extending from the bottom wall, thereby defining a socket space, the main portion of the PCB is secured in the bottom wall, the contact portion and the camera module received in the socket space.

4. The camera apparatus as claimed in claim 3, wherein each of the opposite side walls includes a latching member extending up from the bottom wall.

5. A portable electronic device, comprising:
   a camera apparatus, comprising:
   a camera module;
   a holder including a socket having fixing ends extended from edges of the holder, each of the fixing ends having holes and a resisting member secured in the socket; and
   a PCB including a contact portion; and
   a housing; wherein when the contact portion and the camera module are received in the socket and attached to the housing by the socket, the resisting member pushes the contact portion toward the camera module;
      wherein the resisting member includes a main portion and opposite resisting portions extending from two sides of the main portion, each resisting portion includes a plurality of spaced resisting plates, the main portion is secured in socket and the resisting plates pushes the contact portion; and
      a fixing member, wherein the fixing member is an adhesive sheet sandwiched between the contact portion and the main portion of the resisting member.

6. The portable electronic device as claimed in claim 5, wherein the contact portion of the PCB and the socket define at least one positioning hole.

7. The portable electronic device as claimed in claim 5, wherein the socket includes bottom wall, and side walls extending from the bottom wall, thereby defining a socket space, the main portion of the PCB is secured in the bottom wall, the contact portion and the camera module received in the socket space.

8. The portable electronic device as claimed in claim 7, wherein each of the two opposite side walls includes a latching member extending up from the bottom wall.

9. A method of assembling a portable electronic device with a camera apparatus, comprising:
   providing a camera apparatus, including:
   a camera module;
   a holder including a socket having fixing ends extended from edges of the holder, each of the fixing ends having holes and a resisting member secured in the socket; and
   a PCB including a contact portion;
   providing a housing; securing the socket in the housing; and
   positioning the contact portion and the camera module in the socket with the resisting member pushing the contact portion toward the camera module;
   defining at least one positioning hole in the PCB and the holder;
   providing a positioning structure including a base board and at least one positioning post;
   placing the positioning structure at one side opposite to the holder of the housing with the positioning post extending through the position hole when positioned in the socket; and
   wherein the holder is adhered to the contact portion of the PCB.

* * * * *